(12) United States Patent
Sim et al.

(10) Patent No.: US 7,796,819 B2
(45) Date of Patent: Sep. 14, 2010

(54) APPARATUS AND METHOD FOR CHARACTER RECOGNITION USING ACCELERATION SENSOR

(75) Inventors: Jae Cheol Sim, Daejeon (KR); Jong Moo Sohn, Daejeon (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 953 days.

(21) Appl. No.: 11/633,180

(22) Filed: Dec. 4, 2006

(65) Prior Publication Data

US 2007/0133881 A1 Jun. 14, 2007

(30) Foreign Application Priority Data

Dec. 9, 2005 (KR) .................. 10-2005-0120299

(51) Int. Cl.
*G06K 9/46* (2006.01)
*G06K 9/00* (2006.01)

(52) U.S. Cl. ....................... 382/202; 382/122

(58) Field of Classification Search .......... 382/154, 382/187, 197, 202, 107, 119, 122, 188; 178/18.01; 73/865.4; 348/161
See application file for complete search history.

(56) References Cited

U.S. PATENT DOCUMENTS

| 5,497,318 | A  | * | 3/1996 | Miyagawa et al. ............ 705/12 |
| 6,229,102 | B1 | * | 5/2001 | Sato et al. ................ 178/19.01 |
| 6,625,314 | B1 |   | 9/2003 | Okamoto |
| 6,897,854 | B2 | * | 5/2005 | Cho et al. .................... 345/179 |
| 7,427,979 | B2 | * | 9/2008 | Park et al. ................... 345/156 |
| 7,522,771 | B2 | * | 4/2009 | Sutanto et al. ............. 382/203 |

FOREIGN PATENT DOCUMENTS

| JP | 2001-117694 | 4/2001 |
| JP | 2002-169645 | 6/2002 |
| JP | 2002-196869 | 7/2002 |
| JP | 2005-000471 | 1/2005 |
| KR | 1020010112016 | 12/2001 |
| KR | 1020020006237 | 1/2002 |
| KR | 10-2002-0072081 | 9/2002 |
| KR | 1020040016690 | 2/2004 |
| KR | 10-2004-0081270 | 9/2004 |
| KR | 10-2004-0081855 | 9/2004 |
| KR | 10-2004-0082558 | 9/2004 |
| KR | 1020050097288 | 10/2005 |
| KR | 1020050104529 | 11/2005 |

OTHER PUBLICATIONS

English translation of Japanese Patent No. 10-187341, pp. 1-22, 1998.*
Cho, S.J., et al., "*Magic Wand*: A Hand-Drawn Gesture Input Device in 3-D Space with Inertial Sensors." 2004. *Proceedings of the 9th Int'l Workshop on Frontiers in Handwriting Recognition* (IWFHR-9 2004) (0-7695-2187-8/04).

* cited by examiner

*Primary Examiner*—Daniel G Mariam
(74) *Attorney, Agent, or Firm*—Ladas & Parry LLP

(57) ABSTRACT

Provided are an apparatus and method for character recognition that analyze three-dimensional motion of a user using an acceleration sensor and thereby perform character input and character recognition. The apparatus and method easily discern each stroke on the basis of a direction of motion at the beginning portion and end portion of the stroke, and recognize a character using a combination of the strokes, thereby enabling realization of a small-sized motion-based character input system.

19 Claims, 6 Drawing Sheets

TYPE 1　　　　TYPE 2　　　　TYPE 3　　　　TYPE 4

TYPE 5　　　　TYPE 6　　　　TYPE 7　　　　TYPE 8

TYPE 9　　　　TYPE 10　　　　TYPE 11　　　　TYPE 12

TYPE 13　　　　TYPE 14　　　　TYPE 15　　　　TYPE 16

FIG. 8

| STROKE TYPE | BEGINNING | | ENDING | |
|---|---|---|---|---|
| | AXIS INFORMATION | INCLINATION | AXIS INFORMATION | INCLINATION |
| 1(ㄱ) | +X | UPWARD,FLAT | -Z | FLAT,DOWNWARD |
| 2(ㄴ) | -Z | UPWARD,FLAT | +X | FLAT,DOWNWARD |
| 3(ㅣ) | -Z | UPWARD,FLAT | -Z | FLAT,DOWNWARD |
| ⋮ | ⋮ | ⋮ | ⋮ | ⋮ |
| 8(⁊) | +X | UPWARD,FLAT | -X -Z | FLAT,DOWNWARD |

FIG. 9

| LETTER | SEQUENCE OF STROKES |
|---|---|
| ㄱ | 1(ㄱ) |
| ㄴ | 2(ㄴ) |
| ㄷ | 4-2(-ㄴ) |
| ㄹ | 1-4-2(ㄱ-ㄴ) |
| ⋮ | ⋮ |
| ㅔ | 4-4-3-3 (- - ㅣㅣ) |

APPARATUS AND METHOD FOR CHARACTER RECOGNITION USING ACCELERATION SENSOR

CROSS-REFERENCE TO RELATED APPLICATION

This application claims priority to and the benefit of Korean Patent Application No. 2005-120299, filed Dec. 9, 2005, the disclosure of which is incorporated herein by reference in its entirety.

BACKGROUND

1. Field of the Invention

The present invention relates to an apparatus and method for character recognition by recognizing user's writing motion using an acceleration sensor, which can be employed in various information electronic appliances.

2. Discussion of Related Art

In order to control the various electronic devices that have been developed, various user interface devices have been developed. In order to input text, keyboards or peripherals, such as a mouse, tablet, or touch screen, that sense motion in a two-dimensional space and convert the motion into text have been generally used. However, various other ideas have been suggested to perform control by sensing user's motion in three-dimensions.

Methods for sensing motion in three-dimensions can be classified into three types.

According to the first type of method, a moving object is photographed using cameras and the motion is analyzed by performing image processing of the photographs. Such a method has drawbacks in that a plurality of cameras are necessary, a user should use an object having a specific shape or color for the image processing, and the processing is complicated.

The second type of method uses the principle of triangulation. In such a method, a user device emits or reflects radio waves or sound waves and three or more receiving units record the time that the emitted/reflected radio waves/sound waves are received to triangulate the position of an object. Such a method also has drawbacks in that a plurality of transmission devices or reception devices should be arranged and precision is low.

Lastly, the third type of method involves attaching an inertial sensor to a user or a user device in order to directly detect motion. When employing such a method, three-axis translational motion and three-axis rotational motion should be sensed in order to determine the overall motion of an object in three-dimensions. Such translational motion and rotational motion can be sensed using inertial sensors like an acceleration sensor and a gyroscope sensor. According to such a method, slight motion can be sensed with relatively simple processing. However, there is a limit to miniaturization because an acceleration sensor and a gyroscope sensor should be used for three axes.

A method for character recognition according to the conventional techniques integrates acceleration twice, thereby calculating traces of motion. However, since sensing errors are accumulated in the integration process and results in a large difference of trace, it is very hard to compensate error for accurate recognition.

In addition, the conventional methods for sensing motion in three-dimensions have problems in distinguishing motion corresponding to a valid stroke among user motion from motion occurring between two strokes, thus causing difficulty in accurate recognition.

SUMMARY OF THE INVENTION

The present invention is directed to an apparatus and method for character recognition that employs only a three-axis acceleration sensor, use geometric characteristics of strokes forming a character to minimize the number of additional devices, and thus facilitate miniaturization.

The present invention is also directed to an apparatus and method for character recognition that exhibit a high recognition rate using a simple process that does not require integration and compensation process to calculate an accurate trace.

One aspect of the present invention provides an apparatus for character recognition using an acceleration sensor, comprising: a sensor unit including an acceleration sensor for sensing motion of a user and a data converter for converting the motion sensed by the acceleration sensor into digital acceleration data; an analysis unit producing directional information of a beginning and an end of a stroke and an inclination using the digital acceleration data transmitted from the sensor unit, combining distinguished strokes, and determining a character; and a service unit receiving and expressing the determined character to the user.

The analysis unit may comprise: an inclination calculator for calculating an angle currently formed between the sensor and the ground surface using the acceleration data; an inclination compensator for compensating the acceleration data for gravity and the inclination of the sensor on the basis of the inclination calculated by the inclination calculator; a stroke extractor observing variation of total kinetic energy using the acceleration data compensated based on the inclination, and distinguishing a stroke section; an energy calculator calculating the total kinetic energy and per-axis kinetic energies and determining a direction of the motion with respect to a predetermined time period after a beginning of the stroke section and before the end of the stroke section on the basis of the acceleration data compensated based on the inclination; and a character determiner determining each stroke on the basis of the per-axis energies and the direction of the motion calculated by the energy calculator, combining the determined strokes, and forming a character.

Another aspect of the present invention provides a method for character recognition using an acceleration sensor, comprising the steps of: determining a beginning and an end of a stroke on the basis of energy of user's motion; determining a shape of the stroke using information of per-axis motion directions and per-axis energies of the determined beginning and end of the stroke; and recognizing a character using a combination of the determined strokes.

The step of determining the shape of the stroke may comprise the steps of: calculating per-axis energies of a predetermined time period after the beginning of the stroke and a predetermined time period before the end of the stroke using user motion data compensated for gravity and an inclination of the sensor; comparing the calculated per-axis energies with each other, and determining an axis along which main motion is made; and determining a direction of the motion along the determined axis, and comparing the axis and direction of the motion at the beginning and end with the axis and direction at the beginning and end of a previously defined stroke.

In the step of determining the axis along which main motion is made, when a difference between energies of two axes other than an axis perpendicular to an input plane of the user exceeds a predetermined threshold value, an axis of larger energy may be determined to be the axis along which main motion is made, and when the difference does not exceed the threshold value, the two axes both may be determined to be axes along which main motion is made.

In the step of comparing the axes and directions, strokes not part of letters or numerals may be defined to be used for functions of space, backspace, and mode change, the comparison may be made, and thereby the input assist functions may be given.

In the step of recognizing the character, a table or a status transition machine may be made up of a sequence of strokes forming a character, and the recognition may be performed by comparing a sequence of input strokes with the sequence making up the table or running the state transition machine Still another aspect of the present invention provides a method for character recognition using an acceleration sensor, comprising: a first step of writing, by a user, with a device equipped with an acceleration sensor on a virtual writing plane; a second step of converting, at the acceleration sensor, motion of the user into digital acceleration data; a third step of calculating an angle currently formed between the sensor and the ground surface using the digital acceleration data, and producing an inclination of the sensor; a fourth step of compensating the acceleration data for gravity and inclination on the basis of the inclination of the sensor; a fifth step of distinguishing a stroke section using the acceleration data compensated based on the inclination on the basis of variation of total kinetic energy; a sixth step of calculating the total kinetic energy and per-axis kinetic energies on the basis of acceleration data compensated based on the inclination of the stroke section, and determining per-axis directions of the motion; a seventh step of determining each stroke on the basis of the calculated per-axis energies and the determined directions of the motion, combining the determined strokes, and completing a character; and an eighth step of showing the completed character to the user and achieving character input.

In the sixth step, the calculation of per-axis kinetic energies may be performed for a time period of the beginning and end of the stroking section, or for the peak of an per-axis acceleration near the beginning and end of the stroking section.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which:

FIG. 8 illustrates a stroke discerning information table of a character recognition apparatus according to an exemplary embodiment of the present invention; and FIG. 9 illustrates a letter composition information table of a character recognition apparatus according to an exemplary embodiment of the present invention.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully inform the scope of the present invention to those of ordinary skill in the art.

Figure 1:
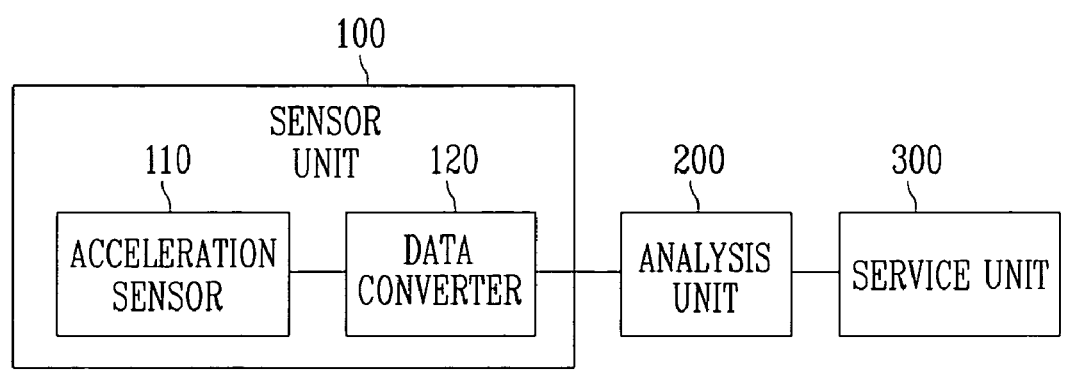
FIG. 1 is a block diagram of an apparatus for character recognition using an acceleration sensor according to an exemplary embodiment of the present invention.

FIG. 1 is a block diagram of an apparatus for character recognition using an acceleration sensor according to an exemplary embodiment of the present invention.

As illustrated in FIG. 1, the character recognition apparatus includes a sensor unit 100, an analysis unit 200, and a service unit 300. The sensor unit 100 includes a three-axis acceleration sensor 110 for sensing motion of a user, and a data converter 120 converting the motion sensed by the acceleration sensor 110 into digital acceleration data. The analysis unit 200 deduces direction of the beginning and the end of a stroke and an inclination from the digital acceleration data transmitted from the sensor unit 100, and combines strokes to form a letter as an analysis result. The service unit 300 receives the analysis result as input and displays it to the user.

Here, the sensor unit 100 and the analysis unit 200 may be implemented as one device and may transmit the analysis result to the service unit 300 through a variety of wired and wireless interfaces. Otherwise, the analysis unit 200 may be included in the service unit 300 and connected to the sensor unit 100 through wired and wireless interfaces.

Figure 3:
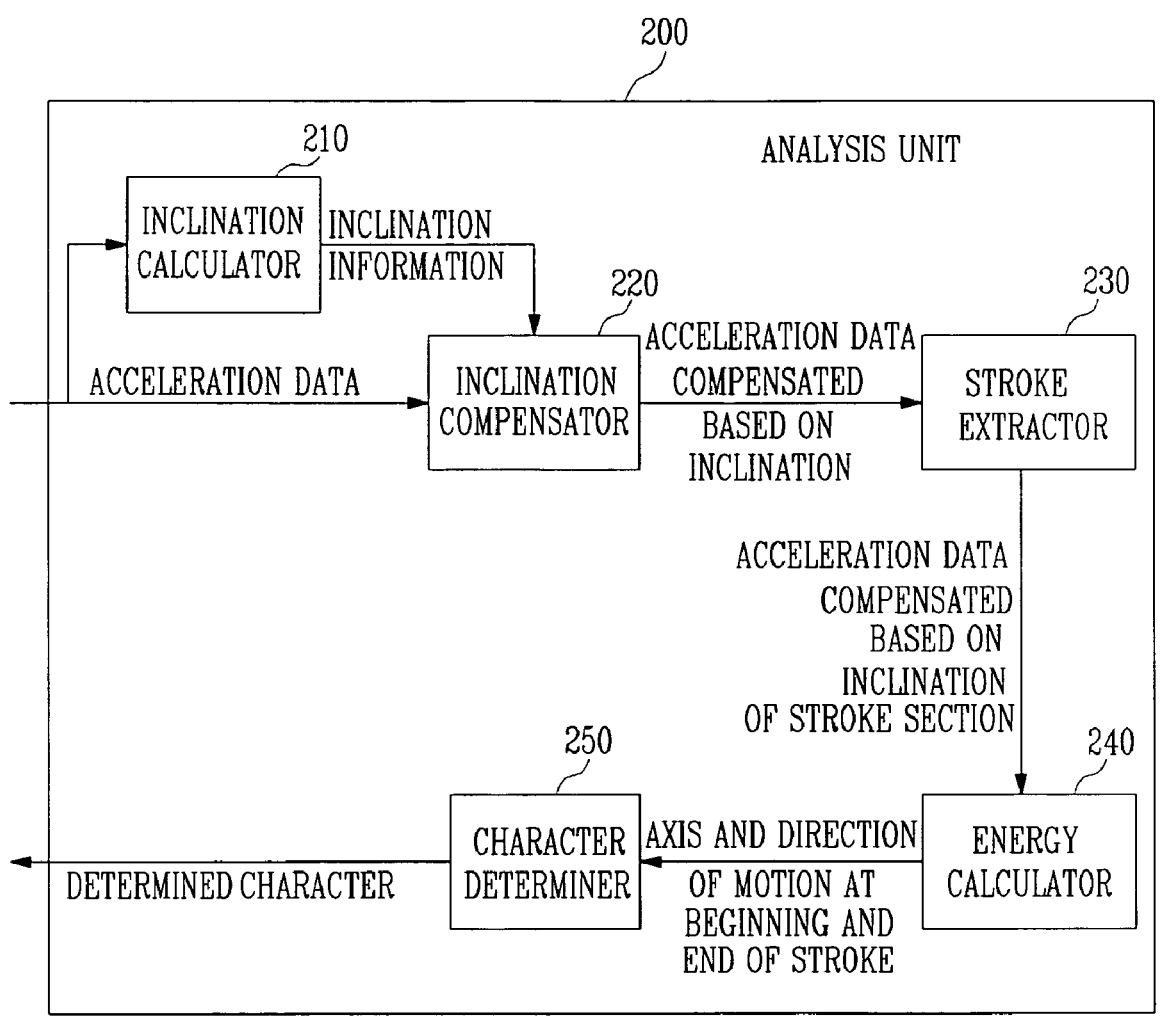
FIG. 3 is a block diagram of an analysis unit of a character recognition apparatus according to an exemplary embodiment of the present invention.

As illustrated in FIG. 3, the analysis unit 200 includes an inclination calculator 210, an inclination compensator 220, a stroke extractor 230, an energy calculator 240, and a character determiner 250. The inclination calculator 210 calculates an angle currently formed between the sensor and the ground surface using input acceleration data. The inclination compensator 220 compensates the acceleration data for gravity and the inclination of the sensor on the basis of an inclination calculated by the inclination calculator 210. The stroke extractor 230 observes variation of total kinetic energy using the acceleration data compensated based on the inclination, thereby distinguishing a stroke section. The energy calculator 240 calculates the total kinetic energy and per-axis kinetic energies on the basis of the acceleration data of the stroke section compensated based on the inclination, and determines a direction of motion. The character determiner 250 determines each stroke on the basis of the per-axis kinetic energies calculated by the energy calculator 240 and the determined direction of motion, and combines the determined strokes to form a letter.

Here, the energy calculator 240 easily determines the direction of motion according to the sign of the acceleration data compensated based on the inclination.

Operation of the character recognition apparatus using an acceleration sensor and constructed as described above according to the present invention will be described below in detail with reference to the appended drawings.

A user writes by hand using the apparatus having a virtual writing plane 130 and the sensor unit 100 mounted on the virtual writing plane 130. Here, as illustrated in FIG. 2, the user writes with the apparatus equipped with the sensor unit 100 on the virtual writing plane 130.

Motion of the user sensed by the acceleration sensor 100 in the sensor unit 100 is converted into digital acceleration data by the data converter 120. Then, the acceleration data is transmitted to the analysis unit 200 which processes the acceleration data.

Figure 2:
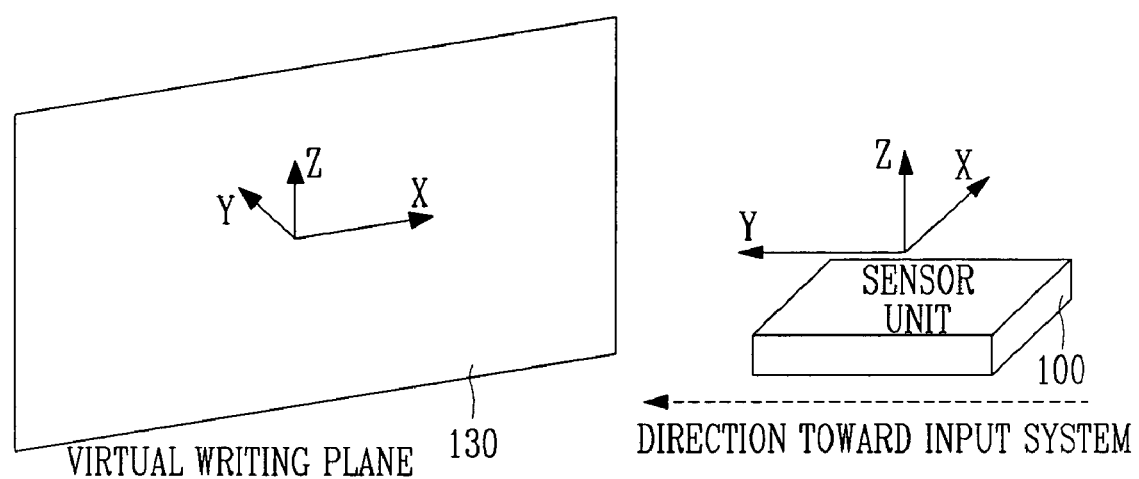
FIG. 2 illustrates an example of using a character recognition apparatus according to an exemplary embodiment of the present invention.

Here, as illustrated in FIG. 2, an axis of the sensor unit 100 does not always coincide with an axis of the virtual writing plane 130. In addition, due to the influence of gravity, the acceleration data measured by the acceleration sensor 110 is distorted.

Therefore, the inclination calculator 210 processes the input acceleration data and calculates an angle currently formed between the sensor and the ground surface. Here, since an acceleration of 1 G is always detected by the acceleration sensor 110 due to the gravity of the earth, the inclination of the sensor is calculated using Formula 1 given below.

$$\theta = \tan^{-1}\left[\frac{a_{bx}}{\sqrt{a_{by}^2 + a_{bz}^2}}\right]$$

$$\phi = -\tan^{-1}\left[\frac{a_{by}}{\sqrt{a_{bx}^2 + a_{bz}^2}}\right]$$

Formula 1

$\theta$ is a pitch value denoting angular variation of an X axis and a Z axis when the two axes rotate counterclockwise about a Y axis. And, $\phi$ is a roll value denoting angular variation of the Y axis and the Z axis when the two axes rotate counterclockwise about the X axis. In addition, $a_{bx}$, $a_{by}$, and $a_{bz}$ each denote a per-axis acceleration value at the sensor.

Subsequently, the inclination compensator 220 compensates the input acceleration data for gravity on the basis of the inclination calculated by the inclination calculator 210. In the compensation process, the motion of the user on an input plane from which the influence of gravity and the inclination of the sensor are eliminated can be obtained by Formula 2 given below.

plane. In addition, $C_b^n$ denotes a transformation matrix for transforming acceleration of the sensor into acceleration in the writing plane, and $C_n^b$ denotes a transformation matrix for transforming acceleration in the writing plane into acceleration of the sensor.

Subsequently, the stroke extractor 230 observes variation of the total kinetic energy on the basis of the acceleration data compensated based on the inclination.

When the user writes characters, motion is made not only for valid strokes but also between strokes. When the stroke extractor 230 identifies motion between strokes as a stroke, recognition may fail. Therefore, it is necessary to distinguish a stroke to be recognized from motion to be ignored between strokes.

To this end, when there is a switch, the user may express valid motion composing the stroke by manipulating the switch. However, when there is no such switch, motion should be distinguished using characteristics of motion of the user.

More specifically, when the user makes a stroke, he/she makes an initial preparatory motion, stops writing for a moment, and stops writing once again at the end of the stroke, even in three-dimensions, similar to the case of writing on paper with a pen.

The stroke extractor 230 uses this pattern to distinguish a valid stroke.

Figure 4:
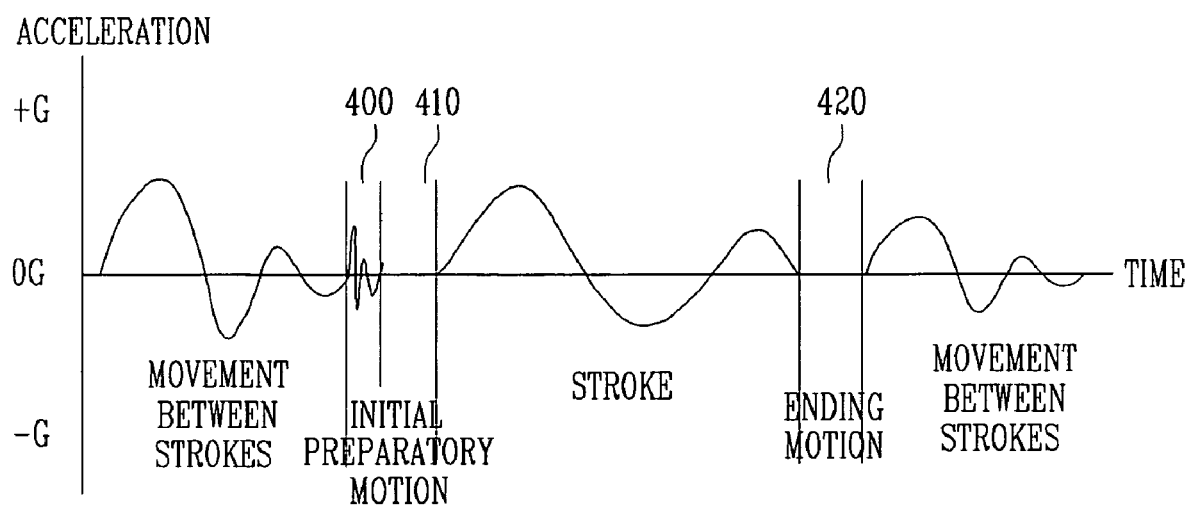
FIG. 4 illustrates characteristics of an acceleration pattern shown when characters are written using a character recognition apparatus according to an exemplary embodiment of the present invention.

FIG. 4 illustrates characteristics of an acceleration pattern shown when characters are written.

As illustrated in FIG. 4, acceleration of a short impulse pattern 400 appears along every axis (particularly large along an axis perpendicular to the writing plane) in general preparatory motion. Subsequently, a short stationary pattern 410 appears, and then another short stationary interval 420 is shown in ending motion. Using such a pattern, it is possible to distinguish a valid stroke from invalid motion between strokes.

Therefore, the stroke extractor 230 determines motion after the short stationary pattern 410, following the short impulse pattern 400 shown in user preparatory motion before writing a stroke, to be the beginning of the stroke. And, the stroke extractor 230 determines motion before the short repose 420, shown after completion of the stroke, to be the end of the stroke. Here, the stroke extractor 230 identifies a cycle of valid stroke writing motion consisting of preparation, stroking, and ending, and discards invalid motion between strokes from objects for recognition.

$$A_n = C_b^n A_b$$

$$C_b^n = C_n^{b^t}$$

$$= \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

$$C_b^n|_{\psi=0} = \begin{bmatrix} \cos\theta & \sin\phi\sin\theta & \cos\phi\sin\theta \\ 0 & \cos\phi & -\sin\phi \\ -\sin\theta & \sin\phi\cos\theta & \cos\phi\cos\theta \end{bmatrix}$$

Formula 2

Here, $\Psi$ is a yaw value denoting angular variation of the X axis and Y axis when the two axes rotate counterclockwise about the Z axis. $A_b$ denotes an acceleration matrix of the sensor, and $A_n$ denotes an acceleration matrix of the writing With respect to the initial preparatory motion, the total energy of the impulse pattern and the stationary pattern is calculated by Formula 3.

$$E_{Total} = \sqrt{a_{bx}^2 + a_{by}^2 + a_{bz}^2} \qquad \text{Formula 3}$$

Subsequently, on the basis of the acceleration data of a stroke section compensated based on the inclination in the stroke extractor 230, the energy calculator 240 calculates the total kinetic energy and per-axis kinetic energies, and determines a direction of the motion. Here, the direction of the motion is easily determined according to the sign of the acceleration data compensated based on the inclination.

The calculation of per-axis energy may be performed for only a predetermined time period (50 ms in this embodiment) of the beginning and end of the stroke section as defined in Formula 4 given below, or for only the peak of per-axis acceleration near the beginning and end of the stroke. Formula 4

$$E_x = \Sigma a_{nx}^2$$

$$E_y = \Sigma a_{ny}^2$$

$$E_z = \Sigma a_{nz}^2$$

Here, $a_{nx}$, $a_{ny}$ and $a_{nz}$ each denote an acceleration value for each axis.

Figure 5:
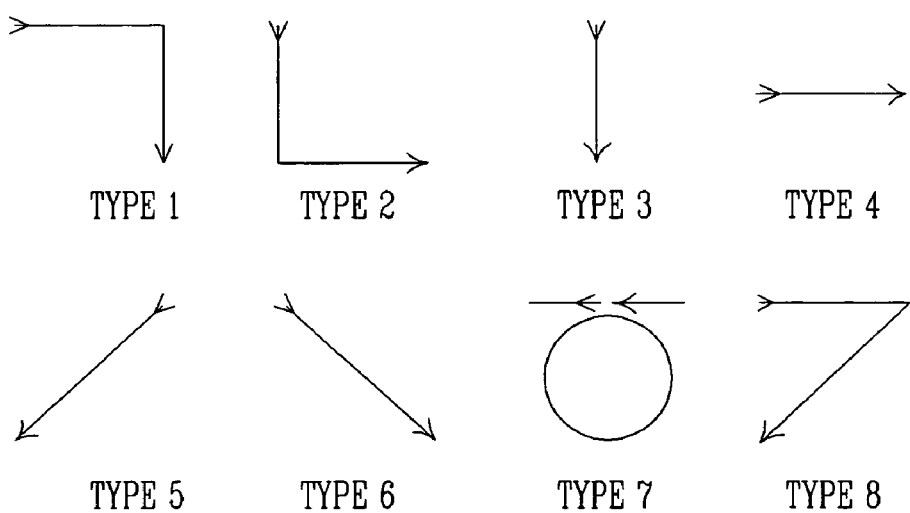
FIG. 5 illustrates strokes forming characters of the Korean alphabet according to a character recognition apparatus of the present invention.
Figure 6:
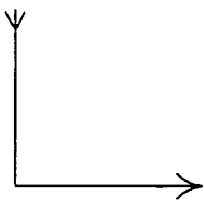
FIG. 6 illustrates strokes forming characters of the English alphabet according to a character recognition apparatus of the present invention.
Figure 6:
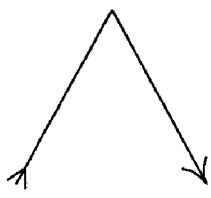
Figure 6:
Figure 6:
Figure 6:
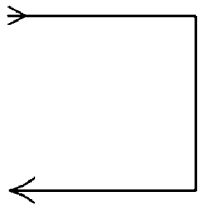
Figure 6:
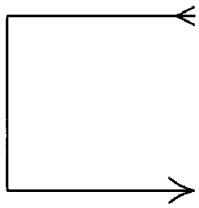
Figure 6:
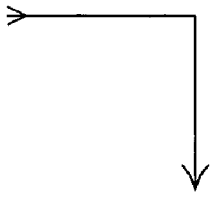
Figure 6:
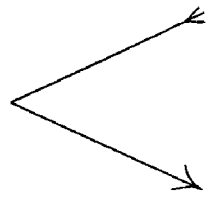
Figure 6:
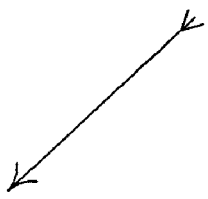
Figure 6:
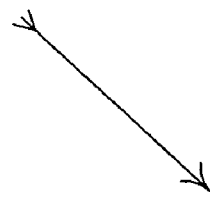
Figure 6:
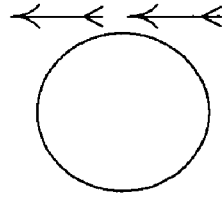
Figure 6:
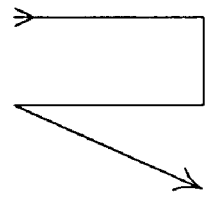
Figure 6:
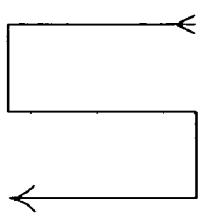
Figure 6:
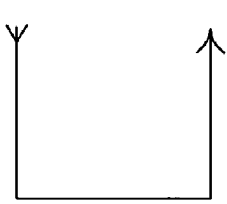
Figure 6:
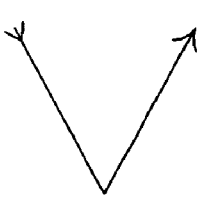
Figure 6:
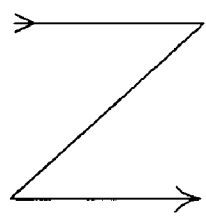
Figure 7:
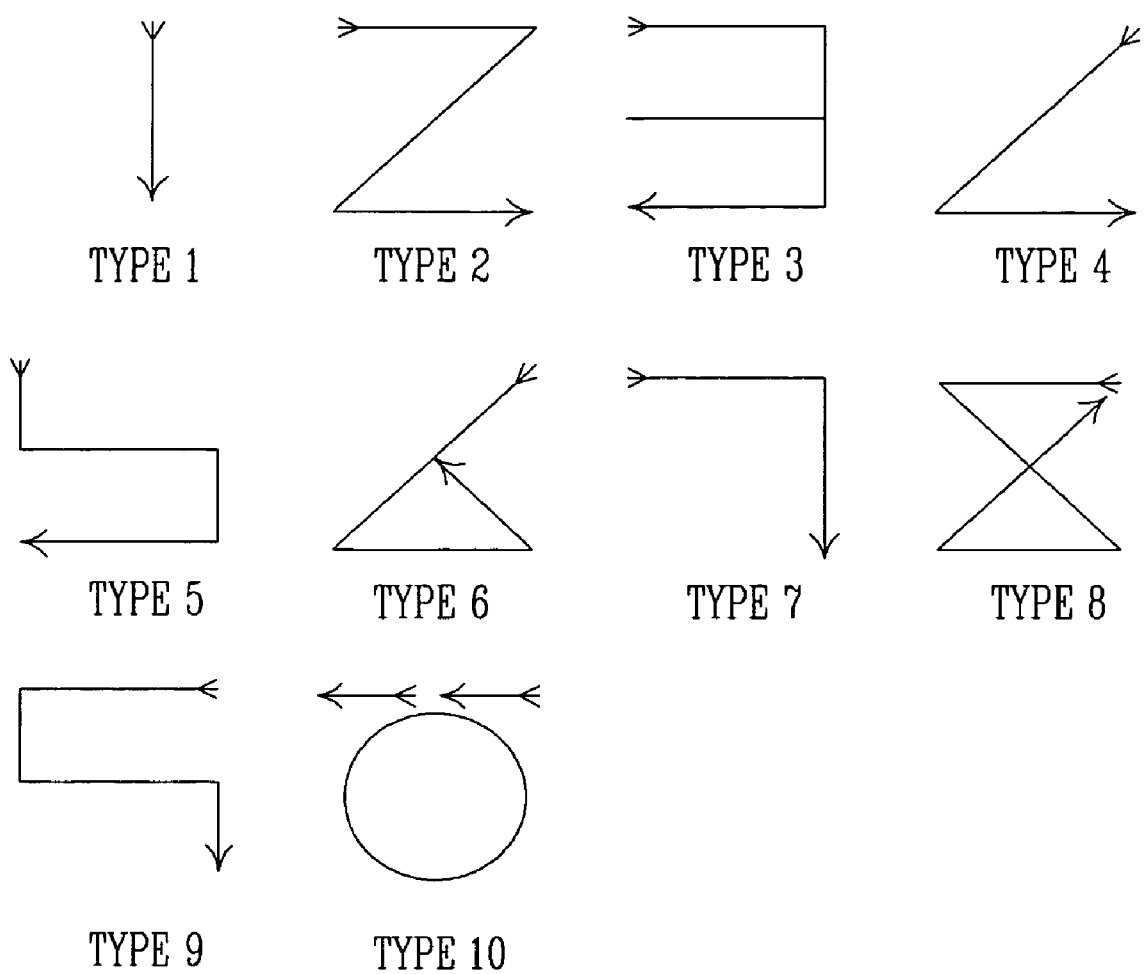
FIG. 7 illustrates strokes composing numerals according to a character recognition apparatus of the present invention.

FIG. 5 illustrates strokes forming characters of the Korean alphabet according to an exemplary embodiment of the present invention, FIG. 6 illustrates strokes forming characters of the English alphabet according to an exemplary embodiment of the present invention, and FIG. 7 illustrates strokes composing numerals according to an exemplary embodiment of the present invention.

As illustrated in FIGS. 5, 6 and 7, all letters of the Korean alphabet, the English alphabet, and all numbers can be composed of the strokes shown in FIGS. 5, 6 and 7, respectively.

More specifically, when a character is written on a vertical plane, energy of the Y axis is discarded, and directions and energies of the X axis and the Z axis are compared with each other. Since user's motion is not exactly horizontal or vertical, horizontal (X axis) energy is observed even in vertical (Z axis) motion.

Thus, the per-axis energies of the predetermined time periods after the beginning of the stroke and before the end of the stroke are calculated using user motion data compensated for gravity and the inclination of the sensor by the inclination compensator 220, the calculated per-axis energies are compared with each other, and thereby an axis along which main motion is made is determined. Then, the direction of the motion is determined, the axis and direction of motion at the beginning and end are compared with the axis and direction at the beginning and end of a previously defined stroke, and thereby the shape of the stroke is determined. Here, each stroke is determined on the basis of per-axis energies and a direction of motion calculated/determined by the energy calculator 240.

Here, the determination of an axis along which main motion is made is made as follows. When a difference between energies of two axes other than an axis perpendicular to the input plane of the user exceeds a predetermined threshold value, an axis of larger energy is determined to be the axis along which main motion is made. On the contrary, when the difference between energies of the two axes does not exceed the threshold value, the two axes both are determined to be axes along which main motion is made.

In other words, when the difference between energies of the two axes exceeds the threshold value, it is determined that the motion is made along the axis of larger energy, and when the difference is smaller than the threshold value, it is determined that the motion is made diagonally.

Preferably, the comparison of axes and directions at the beginnings and endings of the stokes may be made after strokes not composing any letter of an alphabet set are defined to be used for the input assist functions of space, backspace, and mode change, and thus the functions may be given to the strokes.

For example, with respect to type 3 of FIG. 5, it is determined that motion is made in the +X direction at the beginning point and in the −Z direction at the end point. In addition, with respect to type 8 of FIG. 5, it is determined that motion is made in the +X direction at the beginning point and in the (−X, −Z) direction at the end point.

These can be expressed as ((+X),(−Z)) for type 3 of FIG. 5, and ((+X),(−X,−Z)) for type 8.

Such information for determination of a stroke may be kept in tabular form as illustrated in FIG. 8, so that it is possible to determine a stroke by searching the table.

The character determiner 250 configures and keeps a table of a stroke type combination for each letter in advance as illustrated in FIG. 9, and combines the determined strokes to form a letter.

For example, 'ㄹ' may be formed by a stroke sequence of (3-8-4), and 'ㅏ' may be formed by a stroke sequence of (1-8-8).

In this manner, the character determiner 250 configures the table of such sequences, searches the table, and thus can determine which letter is input. Separate tables may be configured for the Korean alphabet, the English alphabet, and numerals, and the appropriate table can be applied according to mode change.

In addition, besides information on an axis and direction, information on inclinations at beginning and end points may be additionally utilized.

In general, when vertical motion is required, users tend to start a stroke pointing upward or downward than the position of the sensor.

For example, with respect to type 1 of FIG. 6, users tend to start a stroke at or above a horizontal line. With respect to type 2, users tend to start a stroke at or below a horizontal line. By keeping such information in a table to use when it is hard to determine a stroke using axis and direction alone, a recognition rate can be increased.

In addition, by mapping motion along the Y axis, i.e., ((+Y),(−Y)) and ((−Y),(+Y)), and motion of ((−X),(−X)), into functions of space, Korean/English/numeric mode change, backspace, and so on, easier input is possible.

The character determiner 250 sets a predetermined time period between letters in order to process continuous input, and when a time period for which no stroke is input exceeds the predetermined time period, determines that a letter has been completed. In this embodiment, the predetermined time period is defined to be 1 second.

In addition, in order to combine strokes and determine a letter, the character determiner 250 configures a table or a state transition machine with sequences of strokes forming characters, and compares a sequence of an input stroke with the sequences in the table or runs the state transition machine.

In this manner, the character determiner 250 transmits the determined character to the service unit 300, which may be a computer. Here, the recognized letter is expressed to the user and the goal of inputting the character to the service unit is achieved.

As described above, the apparatus and method for character recognition using an acceleration sensor according to the present invention use the acceleration sensor only, and recognize letters using a simple process, thereby capable of being used in place of a computer keyboard and realizing a small-sized motion-based character input system.

In addition, the character recognition apparatus and method can easily recognize letters of an alphabet, such as the Korean alphabet, having a non-continuous stroke structure by easy determination of a stroke and accurate discerning of a letter.

The strokes illustrated in FIGS. 5, 6 and 7 are an exemplary embodiment and can be modified according to a user's handwriting style. Thus, while the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for character recognition, comprising:
   a sensor unit including an acceleration sensor for sensing motion of a user and a data converter for converting the motion sensed by the acceleration sensor into digital acceleration data;
   an analysis unit producing directional information of a beginning and an end of a stroke and an inclination using the digital acceleration data transmitted only from the sensor unit, combining distinguished strokes, and determining a character; and
   a service unit receiving and expressing the determined character to the user.

2. The character recognition apparatus according to claim 1, wherein the analysis unit comprises:
   an inclination calculator for calculating an angle currently formed between the sensor and the ground surface using the acceleration data;
   an inclination compensator for compensating the acceleration data for gravity and the inclination of the sensor on the basis of the inclination calculated by the inclination calculator;
   a stroke extractor observing variation of total kinetic energy using the acceleration data compensated based on the inclination, and distinguishing a stroke section;
   an energy calculator calculating the total kinetic energy and per-axis kinetic energies and determining a direction of the motion with respect to a predetermined time period after a beginning of the stroke section and before the end of the stroke section on the basis of the acceleration data compensated based on the inclination; and
   a character determiner determining each stroke on the basis of the per-axis energies and the direction of the motion calculated by the energy calculator, combining the determined strokes, and forming a character.

3. The character recognition apparatus according to claim 2, wherein the energy calculator determines the direction of the motion according to a sign of the acceleration data compensated based on the inclination.

4. The character recognition apparatus according to claim 1, wherein the strokes are distinguished by a cycle of initial preparatory motion, stroking motion, and ending motion.

5. A method for character recognition using an acceleration sensor, comprising the steps of:
   determining a beginning and an end of a stroke on the basis of energy of user's motion;
   determining a shape of the stroke using information of per-axis motion directions and per-axis energies of the determined beginning and end of the stroke; and
   recognizing a character using a combination of the determined strokes.

6. The character recognition method according to claim 5, wherein in the step of determining the beginning and end of the stroke, the user additionally uses a button or a switch at the beginning and end of the stroke for determination.

7. The character recognition method according to claim 5, wherein in the step of determining the beginning and end of the stroke, the beginning of the stroke is determined to be after a short pause following a short period of noise corresponding to user preparatory motion when the stroke is started, and the end of the stroke is determined to be before a short pause shown after completion of the stroke.

8. The character recognition method according to claim 5, wherein the step of determining the shape of the stroke comprises the steps of:
   calculating per-axis energies of a predetermined time period after the beginning of the stroke and a predetermined time period before the end of the stroke using user motion data compensated for gravity and an inclination of the sensor;
   comparing the calculated per-axis energies with each other, and determining an axis along which main motion is made; and
   determining a direction of the motion along the determined axis, and comparing the axis and direction of the motion at the beginning and end with the axis and direction at the beginning and end of a previously defined stroke.

9. The character recognition method according to claim 8, wherein in the step of determining the axis along which main motion is made, when a difference between energies of two axes other than an axis perpendicular to an input plane of the user exceeds a predetermined threshold value, an axis of larger energy is determined to be the axis along which main motion is made, and when the difference does not exceed the threshold value, the two axes both are determined to be axes along which main motion is made.

10. The character recognition method according to claim 8, wherein in the step of comparing the axes and directions, strokes not part of letters or numerals are defined to be used for input assist functions of space, backspace, and mode change, the comparison is made, and thereby the input assist functions are given.

11. The character recognition method according to claim 5, wherein in the step of recognizing the character, when there is no input of an additional stroke for a predetermined time period, it is determined that all strokes forming the character have been input.

12. The character recognition method according to claim 5, wherein in the step of recognizing the character, a table or a state transition machine is made up of sequences of strokes forming characters, and the recognition is performed by comparing the sequence of input strokes with a sequence making up the table or running the state transition machine.

13. A method for character recognition, comprising:
a first step of writing, by a user, with a device equipped with an acceleration sensor on a virtual writing plane;
a second step of converting, at the acceleration sensor, motion of the user into digital acceleration data;
a third step of calculating an angle currently formed between the sensor and the ground surface using the digital acceleration data, and producing an inclination of the sensor;
a fourth step of compensating the acceleration data for gravity and inclination on the basis of the inclination of the sensor;
a fifth step of distinguishing a stroke section using the acceleration data compensated based on the inclination on the basis of variation of total kinetic energy;
a sixth step of calculating the total kinetic energy and per-axis kinetic energies on the basis of acceleration data compensated based on the inclination of the stroke section, and determining per-axis directions of the motion;
a seventh step of determining each stroke on the basis of the calculated per-axis energies and the determined directions of the motion, combining the determined strokes, and completing a character; and
an eighth step of showing the completed character to the user and achieving character input.

14. The character recognition method according to claim 13, wherein in the third step, the inclination of the sensor is calculated by Formula 1:

$$\theta = \tan^{-1}\left[\frac{a_{bx}}{\sqrt{a_{by}^2 + a_{bz}^2}}\right]$$

$$\phi = -\tan^{-1}\left[\frac{a_{by}}{\sqrt{a_{bx}^2 + a_{bz}^2}}\right]$$

Formula 1 wherein θ is a pitch value denoting angular variation of an X axis and a Z axis when the two axes rotate counterclockwise about a Y axis, Φ is a roll value denoting angular variation of the Y axis and the Z axis when the two axes rotate counterclockwise about the X axis, and $a_{bx}$, $a_{by}$ and $a_{bz}$ each denote an per-axis acceleration value at the sensor.

15. The character recognition method according to claim 13, wherein in the fourth step, the acceleration data compensated based on the inclination is produced by Formula 2:

$$A_n = C_b^n A_b$$

$$C_b^n = C_n^{b^I}$$

$$= \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

$$C_b^n|_{\psi=0} = \begin{bmatrix} \cos\theta & \sin\phi\sin\theta & \cos\phi\sin\theta \\ 0 & \cos\phi & -\sin\phi \\ -\sin\theta & \sin\phi\cos\theta & \cos\phi\cos\theta \end{bmatrix}$$

Formula 2 wherein Ψ is a yaw value denoting angular variation of the X axis and the Y axis when the two axes rotate counterclockwise about the Z axis, $A_b$ denotes an acceleration matrix of the sensor, $A_n$ denotes an acceleration matrix of the writing plane, $C_n^b$ denotes a transformation matrix for transforming acceleration of the sensor into acceleration on the writing plane, and $C_n^b$ denotes a transformation matrix for transforming acceleration on the writing plane into acceleration of the sensor.

16. The character recognition method according to claim 13, wherein in the fifth step, the total energy is calculated by Formula 3:

$$E_{Total} = \sqrt{a_{bx}^2 + a_{by}^2 + a_{bz}^2}$$

Formula 3 wherein $a_{bx}$, $a_{by}$ and $a_{bz}$ each denote an per-axis acceleration value at the sensor.

17. The character recognition method according to claim 13, wherein in the sixth step, the per-axis energies are calculated by Formula 4:

$$E_x = \Sigma a_{nx}^2$$

$$E_y = \Sigma a_{ny}^2$$

$$E_z = \Sigma a_{nz}^2$$

wherein $a_{nx}$, $a_{ny}$ and $a_{nz}$ each denote an per-axis acceleration value on the writing plane.

18. The character recognition method according to claim 13, wherein in the sixth step, the per-axis energies are calculated for a predetermined time period after the beginning of a stroke and before the end of the stroke, or for a peak of an per-axis acceleration near the beginning and end of the stroke.

19. The character recognition method according to claim 18, wherein the predetermined time period is 50 ms.

* * * * *